(12) United States Patent
White et al.

(10) Patent No.: US 8,713,224 B2
(45) Date of Patent: Apr. 29, 2014

(54) SYSTEM AND METHOD FOR TRANSFERRING DATA IN STORAGE CONTROLLERS

(75) Inventors: Theodore C. White, Rancho Santa Margarita, CA (US); William W. Dennin, Mission Viejo, CA (US); Angel G. Perozo, Mission Viejo, CA (US)

(73) Assignee: Marvell International Ltd., Hamilton (BM)

( * ) Notice: Subject to any disclaimer, the term of this patent is extended or adjusted under 35 U.S.C. 154(b) by 840 days.

(21) Appl. No.: 11/232,437

(22) Filed: Sep. 21, 2005

(65) Prior Publication Data

US 2006/0129715 A1   Jun. 15, 2006

Related U.S. Application Data

(63) Continuation of application No. 10/619,954, filed on Jul. 15, 2003, now Pat. No. 7,007,114.

(60) Provisional application No. 60/444,339, filed on Jan. 31, 2003.

(51) Int. Cl.
*G06F 13/10* (2006.01)

(52) U.S. Cl.
USPC .................................. 710/66; 710/34; 710/52

(58) Field of Classification Search
None
See application file for complete search history.

(56) References Cited

U.S. PATENT DOCUMENTS

| | | | |
|---|---|---|---|
| 3,800,281 A | 3/1974 | Devore et al. | |
| 3,988,716 A | 10/1976 | Fletcher et al. | |
| 4,001,883 A | 1/1977 | Strout et al. | |
| 4,016,368 A | 4/1977 | Apple, Jr. | |
| 4,050,097 A | 9/1977 | Miu et al. | |
| 4,080,649 A | 3/1978 | Calle et al. | |
| 4,156,867 A | 5/1979 | Bench et al. | |
| 4,225,960 A | 9/1980 | Masters | |
| 4,275,457 A | 6/1981 | Leighou et al. | |
| 4,390,969 A | 6/1983 | Hayes | |
| 4,451,898 A | 5/1984 | Palermo et al. | |
| 4,486,750 A | 12/1984 | Aoki | |

(Continued)

FOREIGN PATENT DOCUMENTS

| | | |
|---|---|---|
| EP | 0528273 | 2/1993 |
| EP | 0622726 | 11/1994 |

(Continued)

OTHER PUBLICATIONS

PCT International Search Report, Doc. No. PCT/US00/15084, Dated Nov. 15, 2000, 2 pages.

(Continued)

*Primary Examiner* — Ilwoo Park (57) ABSTRACT

A method and system for processing data by a storage controller with a buffer controller coupled to a buffer memory is provided. The method includes, evaluating incoming data block size; determining if the incoming data requires padding; and padding incoming data such that the incoming data can be processed by the buffer controller. The method also includes determining if any pads need to be removed from data that is read from the buffer memory; and removing pads from the data read from the buffer memory. The buffer controller can be set in a mode to receive any MOD size data and includes a first channel with a FIFO for receiving incoming data via a first interface. The buffer controller mode for receiving incoming data can be set by firmware.

12 Claims, 5 Drawing Sheets

(56) References Cited

U.S. PATENT DOCUMENTS

| | | | |
|---|---|---|---|
| 4,500,926 A | 2/1985 | Yoshimaru et al. |
| 4,587,609 A | 5/1986 | Boudreau et al. |
| 4,603,382 A | 7/1986 | Cole |
| 4,625,321 A | 11/1986 | Pechar et al. |
| 4,667,286 A | 5/1987 | Young et al. |
| 4,777,635 A | 10/1988 | Glover |
| 4,805,046 A | 2/1989 | Kuroki et al. |
| 4,807,116 A | 2/1989 | Katzman et al. |
| 4,807,253 A | 2/1989 | Hagenauer et al. |
| 4,809,091 A | 2/1989 | Miyazawa et al. |
| 4,811,282 A | 3/1989 | Masina |
| 4,812,769 A | 3/1989 | Agoston |
| 4,860,333 A | 8/1989 | Bitzinger et al. |
| 4,866,606 A | 9/1989 | Kopetz |
| 4,881,232 A | 11/1989 | Sako et al. |
| 4,920,535 A | 4/1990 | Watanabe et al. |
| 4,949,342 A | 8/1990 | Shimbo et al. |
| 4,970,418 A | 11/1990 | Masterson |
| 4,972,417 A | 11/1990 | Sako et al. |
| 4,975,915 A | 12/1990 | Sako et al. |
| 4,989,190 A | 1/1991 | Kuroe et al. |
| 5,014,186 A | 5/1991 | Chisholm |
| 5,023,612 A | 6/1991 | Liu |
| 5,027,357 A | 6/1991 | Yu et al. |
| 5,050,013 A | 9/1991 | Holsinger |
| 5,051,998 A | 9/1991 | Murai et al. |
| 5,068,755 A | 11/1991 | Hamilton et al. |
| 5,068,857 A | 11/1991 | Yoshida |
| 5,072,420 A | 12/1991 | Conley et al. |
| 5,088,093 A | 2/1992 | Storch et al. |
| 5,109,500 A | 4/1992 | Iseki et al. |
| 5,117,442 A | 5/1992 | Hall |
| 5,127,098 A | 6/1992 | Rosenthal et al. |
| 5,133,062 A | 7/1992 | Joshi et al. |
| 5,136,592 A | 8/1992 | Weng |
| 5,146,585 A | 9/1992 | Smith, III |
| 5,157,669 A | 10/1992 | Yu et al. |
| 5,162,954 A | 11/1992 | Miller et al. |
| 5,193,197 A | 3/1993 | Thacker |
| 5,204,859 A | 4/1993 | Paesler et al. |
| 5,218,564 A | 6/1993 | Haines et al. |
| 5,220,569 A | 6/1993 | Hartness |
| 5,237,593 A | 8/1993 | Fisher et al. |
| 5,243,471 A | 9/1993 | Shinn |
| 5,249,271 A | 9/1993 | Hopkinson et al. |
| 5,257,143 A | 10/1993 | Zangenehpour |
| 5,261,081 A | 11/1993 | White et al. |
| 5,271,018 A | 12/1993 | Chan |
| 5,274,509 A | 12/1993 | Buch |
| 5,276,564 A | 1/1994 | Hessing et al. |
| 5,276,662 A | 1/1994 | Shaver, Jr. et al. |
| 5,276,807 A | 1/1994 | Kodama et al. |
| 5,280,488 A | 1/1994 | Glover et al. |
| 5,285,327 A | 2/1994 | Hetzler |
| 5,285,451 A | 2/1994 | Henson et al. |
| 5,301,333 A | 4/1994 | Lee |
| 5,307,216 A | 4/1994 | Cook et al. |
| 5,315,708 A | 5/1994 | Eidler et al. |
| 5,339,443 A | 8/1994 | Lockwood |
| 5,361,266 A | 11/1994 | Kodama et al. |
| 5,361,267 A | 11/1994 | Godiwala et al. |
| 5,408,644 A | 4/1995 | Schneider et al. |
| 5,420,984 A | 5/1995 | Good et al. |
| 5,428,627 A | 6/1995 | Gupta |
| 5,440,751 A | 8/1995 | Santeler et al. |
| 5,465,343 A | 11/1995 | Henson et al. |
| 5,487,170 A | 1/1996 | Bass et al. |
| 5,488,688 A | 1/1996 | Gonzales et al. |
| 5,491,701 A | 2/1996 | Zook |
| 5,500,848 A | 3/1996 | Best et al. |
| 5,506,989 A | 4/1996 | Boldt et al. |
| 5,507,005 A | 4/1996 | Kojima et al. |
| 5,519,837 A | 5/1996 | Tran |
| 5,523,903 A | 6/1996 | Hetzler et al. |
| 5,544,180 A | 8/1996 | Gupta |
| 5,544,346 A | 8/1996 | Amini |
| 5,546,545 A | 8/1996 | Rich |
| 5,546,548 A | 8/1996 | Chen et al. |
| 5,563,896 A | 10/1996 | Nakaguchi |
| 5,572,148 A | 11/1996 | Lytle et al. |
| 5,574,867 A | 11/1996 | Khaira |
| 5,581,715 A | 12/1996 | Verinsky et al. |
| 5,583,999 A | 12/1996 | Sato et al. |
| 5,592,404 A | 1/1997 | Zook |
| 5,600,662 A | 2/1997 | Zook et al. |
| 5,602,857 A | 2/1997 | Zook et al. |
| 5,615,190 A | 3/1997 | Best et al. |
| 5,623,672 A | 4/1997 | Popat |
| 5,626,949 A | 5/1997 | Blauer et al. |
| 5,627,695 A | 5/1997 | Prins et al. |
| 5,640,602 A | 6/1997 | Takase |
| 5,649,230 A | 7/1997 | Lentz |
| 5,664,121 A | 9/1997 | Cerauskis |
| 5,689,656 A | 11/1997 | Baden et al. |
| 5,691,994 A | 11/1997 | Acosta et al. |
| 5,692,135 A | 11/1997 | Alvarez, II et al. |
| 5,692,165 A | 11/1997 | Jeddeloh et al. |
| 5,719,516 A | 2/1998 | Sharpe-Geisler |
| 5,729,718 A | 3/1998 | Au |
| 5,740,466 A | 4/1998 | Geldman et al. |
| 5,745,793 A | 4/1998 | Atsatt et al. |
| 5,754,759 A | 5/1998 | Clarke et al. |
| 5,758,188 A | 5/1998 | Appelbaum et al. |
| 5,784,569 A | 7/1998 | Miller et al. |
| 5,794,073 A | 8/1998 | Ramakrishnan et al. |
| 5,801,998 A | 9/1998 | Choi |
| 5,815,501 A | 9/1998 | Gaddis et al. |
| 5,818,886 A | 10/1998 | Castle |
| 5,822,142 A | 10/1998 | Hicken |
| 5,831,922 A | 11/1998 | Choi |
| 5,835,930 A | 11/1998 | Dobbek |
| 5,841,722 A | 11/1998 | Willenz |
| 5,844,844 A | 12/1998 | Bauer et al. |
| 5,850,422 A | 12/1998 | Chen |
| 5,854,918 A | 12/1998 | Baxter |
| 5,890,207 A | 3/1999 | Sne et al. |
| 5,890,210 A | 3/1999 | Ishii et al. |
| 5,907,717 A | 5/1999 | Ellis |
| 5,912,906 A | 6/1999 | Wu et al. |
| 5,925,135 A | 7/1999 | Trieu et al. |
| 5,937,435 A | 8/1999 | Dobbek et al. |
| 5,950,223 A | 9/1999 | Chiang et al. |
| 5,968,180 A | 10/1999 | Baco |
| 5,983,293 A | 11/1999 | Murakami |
| 5,991,911 A | 11/1999 | Zook |
| 6,029,226 A | 2/2000 | Ellis et al. |
| 6,029,250 A | 2/2000 | Keeth |
| 6,041,417 A | 3/2000 | Hammond et al. |
| 6,065,053 A | 5/2000 | Nouri et al. |
| 6,067,206 A | 5/2000 | Hull et al. |
| 6,070,200 A | 5/2000 | Gates et al. |
| 6,078,447 A | 6/2000 | Sim |
| 6,081,849 A | 6/2000 | Born et al. |
| 6,092,231 A | 7/2000 | Sze |
| 6,094,320 A | 7/2000 | Ahn |
| 6,124,994 A | 9/2000 | Malone, Sr. |
| 6,134,063 A | 10/2000 | Weston-Lewis et al. |
| 6,157,984 A | 12/2000 | Fisher |
| 6,178,486 B1 | 1/2001 | Gill et al. |
| 6,191,712 B1 * | 2/2001 | Still ............................... 341/95 |
| 6,192,499 B1 | 2/2001 | Yang |
| 6,198,876 B1 * | 3/2001 | Iwasaki et al. ................ 386/235 |
| 6,201,655 B1 | 3/2001 | Watanabe et al. |
| 6,223,303 B1 | 4/2001 | Billings et al. |
| 6,279,089 B1 | 8/2001 | Schibilla et al. |
| 6,297,926 B1 | 10/2001 | Ahn |
| 6,330,626 B1 | 12/2001 | Dennin et al. |
| 6,381,659 B2 | 4/2002 | Proch et al. |
| 6,401,149 B1 | 6/2002 | Dennin et al. |
| 6,434,635 B1 * | 8/2002 | Case et al. ..................... 710/23 |
| 6,438,604 B1 | 8/2002 | Kuver et al. |
| 6,460,097 B1 | 10/2002 | Harumoto et al. |
| 6,466,581 B1 * | 10/2002 | Yee et al. ....................... 370/428 |
| 6,470,461 B1 | 10/2002 | Pinvidic et al. |

(56) References Cited

U.S. PATENT DOCUMENTS

| | | | |
|---|---|---|---|
| 6,487,631 | B2 | 11/2002 | Dickinson et al. |
| 6,490,635 | B1 | 12/2002 | Holmes |
| 6,530,000 | B1 | 3/2003 | Krantz et al. |
| 6,574,676 | B1 | 6/2003 | Megiddo |
| 6,662,334 | B1 | 12/2003 | Stenfort |
| 6,708,258 | B1 | 3/2004 | Potter et al. |
| 6,826,650 | B1 | 11/2004 | Krantz et al. |
| 2002/0095537 | A1* | 7/2002 | Slater .............................. 710/65 |
| 2002/0138692 | A1* | 9/2002 | Gerhart ......................... 711/112 |
| 2002/0146061 | A1 | 10/2002 | Rambaud |

FOREIGN PATENT DOCUMENTS

| | | |
|---|---|---|
| EP | 0718827 | 6/1996 |
| GB | 2285166 | 6/1995 |
| JP | 63-292462 | 11/1988 |
| JP | 01-315071 | 12/1989 |
| JP | 03183067 | 8/1991 |
| WO | 98/14861 | 4/1998 |

OTHER PUBLICATIONS

Blathut R. Digital Transmission of Information (Dec. 4, 1990), pp. 429-430.

Hwang, Kai and Briggs, Faye A., "Computer Architecture and Parallel Processing" pp. 156-164.

Zeidman, Bob, "Interleaving DRAMS for faster access", System Design ASIC & EDA, pp. 24-34 (Nov. 1993).

P.M. Bland et al. Shared Storage Bus Circuitry, IBM Technical Disclosure Bulletin, vol. 25, No. 4, Sep. 1982, pp. 2223-2224.

PCT Search Report for PCT/US00/07780 mailed Aug. 2, 2000, 4 pages.

PCT Search Report for PCT/US01/22404, mailed Jan. 29, 2003, 4 pages.

* cited by examiner

SYSTEM AND METHOD FOR TRANSFERRING DATA IN STORAGE CONTROLLERS

CROSS REFERENCE TO RELATED APPLICATIONS

The present disclosure is a continuation of U.S. patent application Ser. No. 10/619,954 (now U.S. Pat. No. 7,007,114), filed on Jul. 15, 2003, which claims the benefit of U.S. provisional patent application Ser. No. 60/444,339, filed on Jan. 31, 2003. The entire disclosures of the applications referenced above are incorporated herein by reference.

BACKGROUND OF THE INVENTION

1. Field of the Invention

The present invention relates generally storage device controllers, and more particularly to streamlining data flow in storage device controllers.

2. Background

Conventional computer systems typically include several functional components. These components may include a central processing unit (CPU), main memory, input/output ("I/O") devices, and streaming storage devices (for example, tape drives) (referred to herein as "storage device"). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

The storage device is coupled to the host system via a storage device controller that handles complex details of interfacing the storage devices to the host system. Communications between the host system and the controller is usually provided using one of a variety of standard I/O bus interfaces.

Conventionally, when data is read from a storage device, a host system sends a read command to the controller, which stores the read command into the buffer memory. Data is read from the device and stored in the buffer memory.

Typically when data enters the controller from an interface (for example, the "SCSI interface"), the data is MODN aligned (for example, MOD2]. The storage controller includes a buffer memory controller that moves data with a specific alignment, for example, a MOD4 alignment. Hence data must be padded such that it complies with the MOD4 alignment.

In addition, when data is moved from a buffer memory of the controller to the SCSI interface, it has to be re-aligned so that the SCSI interface can send the data out. For example, MOD4 aligned data must be re-aligned to MOD2 data so that it can be read from buffer memory.

Conventional controllers do not provide an efficient system for padding or removing the pad for efficiently transferring data.

Therefore, there is a need for a system to efficiently pad/remove the pad for moving data to/from a controller.

SUMMARY OF THE INVENTION

In one aspect of the present invention, a method for processing incoming data by a storage controller with a buffer controller coupled to a buffer memory is provided. The method includes, evaluating incoming data block size; determining if the incoming data requires padding; and padding incoming data such that the incoming data can be processed by the buffer controller. The incoming data after being padded may be stored in the buffer memory and the buffer controller pads incoming data in real time before being stored in the buffer memory.

In another aspect of the present invention, a method for reading data from the buffer memory operationally coupled to the storage controller through the buffer controller is provided. The method includes determining if any pads need to be removed from the data; and removing pads from the data read from the buffer memory.

In another aspect of the present invention, a storage controller is provided. The storage controller includes a buffer controller that can be set in a mode to receive any MOD size data and includes a first channel with a FIFO for receiving incoming data via a first interface, wherein the incoming data is padded so that it can be stored in a buffer memory. Also, padding may be removed from any data that is read from the buffer memory and the buffer controller mode for receiving incoming data can be set by firmware.

In one aspect of the present invention, a controller can process any MOD size data by padding (or removing the pad). This allows the controller to be flexible and hence more useful in the fast changing storage arena.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, the general architecture and operation of a controller will initially be described. The specific architecture and operation of the preferred embodiment will then be described with reference to the general architecture.

Figure 1A:
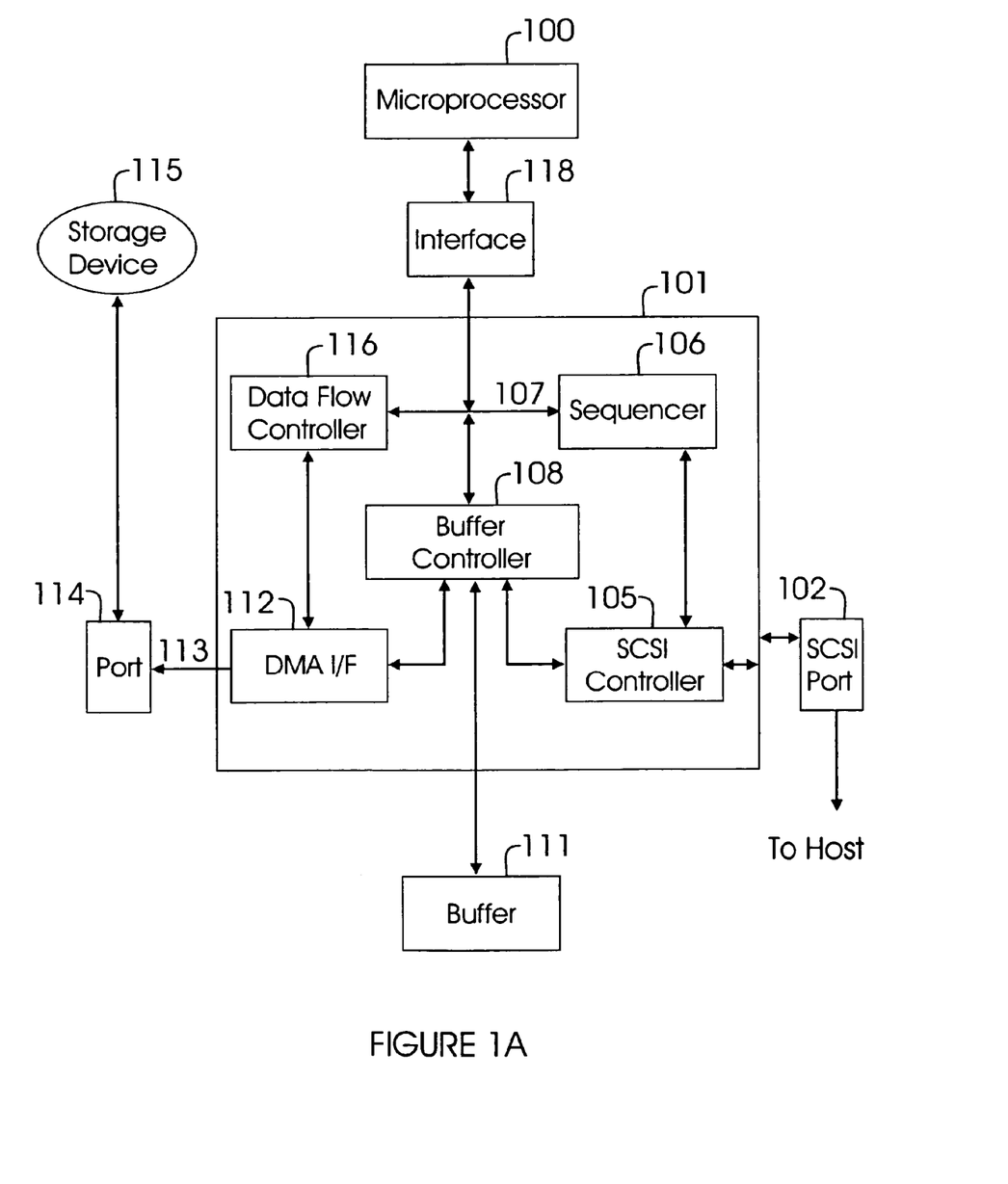
FIG. 1A shows a block diagram of a controller, according to one aspect of the present invention.

System of FIG. 1A is an example of a streaming storage drive system (e.g., tape drive), included (or coupled to) in a computer system. The host computer (not shown) and storage device 115 communicate via port 102, which is connected to a data bus (not shown). In an alternate embodiment (not shown), the storage device 115 is an external storage device, which is connected to the host computer via a data bus. The data bus, for example, is a bus in accordance with a Small Computer System Interface (SCSI) specification. Those skilled in the art will appreciate that other communication buses known in the art can be used to transfer data between the drive and the host system.

As shown in FIG. 1A, the system includes controller 101, which is coupled to SCSI port 102, port 114, buffer memory 111 and microprocessor 100. Interface 118 serves to couple microprocessor bus 107 to microprocessor 100. A read only memory ("ROM") omitted from the drawing is used to store firmware code executed by microprocessor 100. Port 114 couples controller 101 to device 115.

Controller 101 can be an integrated circuit (IC) that comprises of various functional modules, which provide for the writing and reading of data stored on storage device 115. Microprocessor 100 is coupled to controller 101 via interface 118 to facilitate transfer of data, address, timing and control information. Buffer memory 111 is coupled to controller 101 via ports to facilitate transfer of data, timing and address information.

Data flow controller 116 is connected to microprocessor bus 107 and to buffer controller 108. A DMA interface 112 is connected to microprocessor bus 107. DMA Interface 112 is also coupled to data and control port 113 and to data bus 107.

SCSI controller 105 includes programmable registers and state machine sequencers that interface with SCSI port 102 on one side and to a fast, buffered direct memory access (DMA) channel on the other side.

Sequencer 106 supports customized SCSI sequences, for example, by means of a 256-location instruction memory that allows users to customize command automation features. Sequencer 106 is organized in accordance with the Harvard architecture, which has separate instruction and data memories. Sequencer 106 includes, for example, a 32-byte register file, a multi-level deep stack, an integer algorithmic logic unit (ALU) and other special purpose modules. Sequencer 106 support's firmware and hardware interrupts schemes. The firmware interrupt allows microprocessor 100 to initiate an operation within Sequencer 106 without stopping sequencer operation. Hardware interrupt comes directly from SCSI controller 105.

Buffer controller (may also referred to as "BC") 108 connects buffer memory 111 to DMA I/F 112, a SCSI channel of SCSI controller 105 and to micro-controller bus 107. Buffer controller 108 regulates data movement into and out of buffer memory 111.

To read data from device 115, a host system sends a read command to controller 101, which stores the read, commands in buffer memory 111. Microprocessor 100 then read the command out of buffer memory 111 and initializes the various functional blocks of controller 101. Data is read from device 115 and is passed through DMA I/F 112 to buffer controller 108.

Figure 1B:
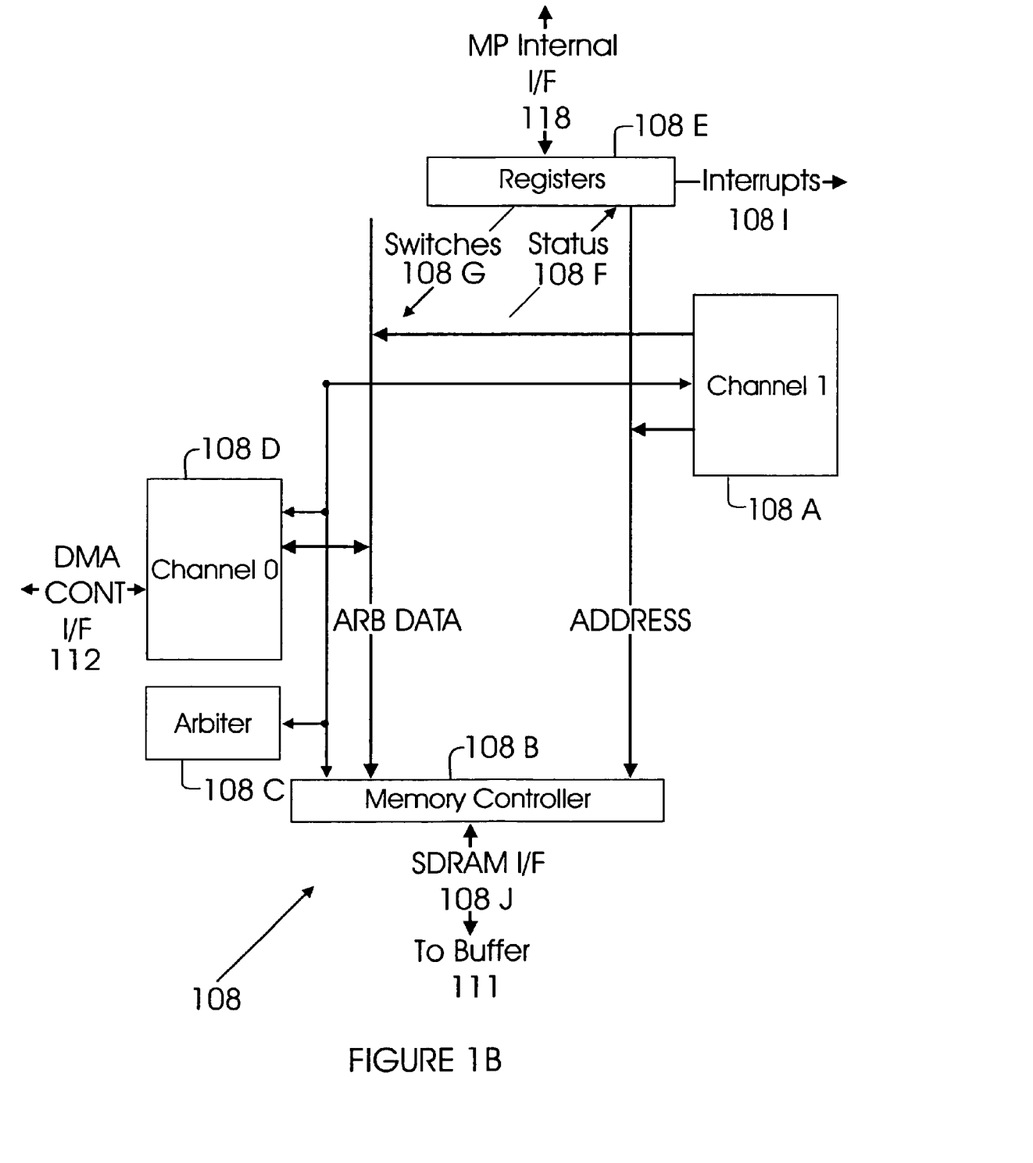
FIG. 1B shows a block diagram of a buffer controller, according to one aspect of the present invention.

FIG. 1B shows a block diagram of BC 108 with Channel 1 108A and Channel 0 108D. BC 108 also includes registers 108E and an Arbiter 108C. Arbiter 108C arbitrates channel 0 108D and channel 1 108A access to controller 108B. Register 108E is used for to store status information and assists in generating interrupts.

Figure 2:
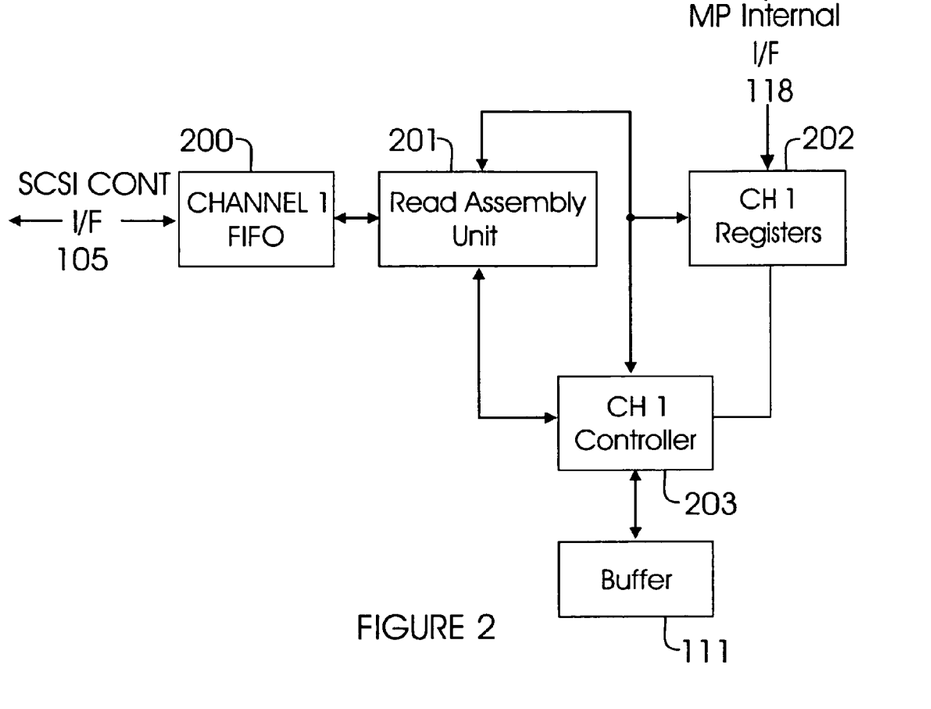
FIG. 2 shows a block diagram of Channel 1, according to one aspect of the present invention.

FIG. 2 shows a block diagram, of Channel 1 108A. Channel 1 108A includes a FIFO 200 that receives data from SCSI interface 105. Channel 1 108A also includes a read assembly unit 201 and plural register 202, operationally coupled to a controller 203 that is coupled to a buffer memory 111.

Channel 1 register(s) 202 includes the following registers/counters that are used for padding data coming from SCSI interface 105 and removing the pads for data that is read from buffer 111:

(a) SCSI Block Size Register: This register holds data blocks destined for buffer 111.

(b) Channel 1 Block size register: This register holds a specific MOD size data block (for example, 512 bytes for MOD4 and 510 bytes for MOD2). This specifies the block size that is sent to buffer 111.

(c) Channel 1 Data Length Counter: This holds a MODN data block and counts how much data has been received. This register is loaded with the same value as the SCSI Block size register when the "Data Length Load Select" bit is reset, as described below. When the "Data Length Load Select" bit is set, Data Length Counter is loaded with Data Length Reload Register value.

(d) Channel 1 Data Length Reload Register: This register holds MODN data block size and is used to reload Data Length Counter.

(e) Channel 1 Control Register: This register includes the following bits used for controlling data transfer:

"Transfer Count Load Select" bit: This bit selects the transfer count (i.e. the block size).

"Assembly Mode" bit: This bit when set allows incoming data to be of any MOD size and padded for storage in buffer 111.

"Data Length Load Select" bit: This bit allows loading of data in Data Length Counter either from SCSI block Size register or Data Length Reload Register.

The foregoing bits may be set by controller 101 firmware such that any MOD size data can be processed (by setting the "Assembly Mode" bit).

It is noteworthy that the foregoing register configuration is shown to illustrate the adaptive aspects of the present and not to limit the present invention.

Figure 3:
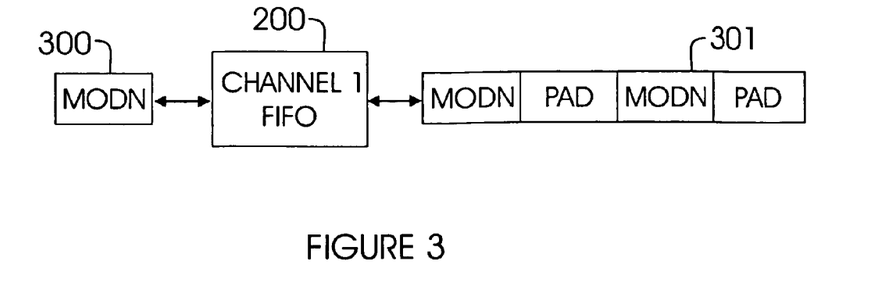
FIG. 3 shows a block diagram showing data coming from an interface, according to one aspect of the present invention.
Figure 4:
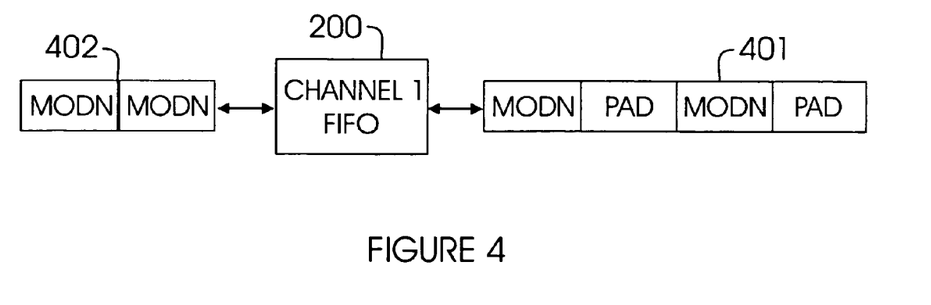
FIG. 4 shows an example of data moving from buffer memory to an interface, according to one aspect of the present invention.

FIGS. 3 and 4 show block diagrams of how data is padded and padding is removed, according to one aspect of the present invention. FIG. 3 shows incoming data 300 is received by FIFO 200. This data is received from SCSI interface 105 and may be MODN aligned, which may be different than how data is stored in buffer 111. Data 300 leaving FIFO 200 is padded (for example MODN data is padded to MOD4) so that it can be stored in buffer 111.

For buffer 111 read operations, as shown in FIG. 4, MOD4 data 401 enters FIFO 200 and then the pad is removed so that data can be read.

Figure 5:
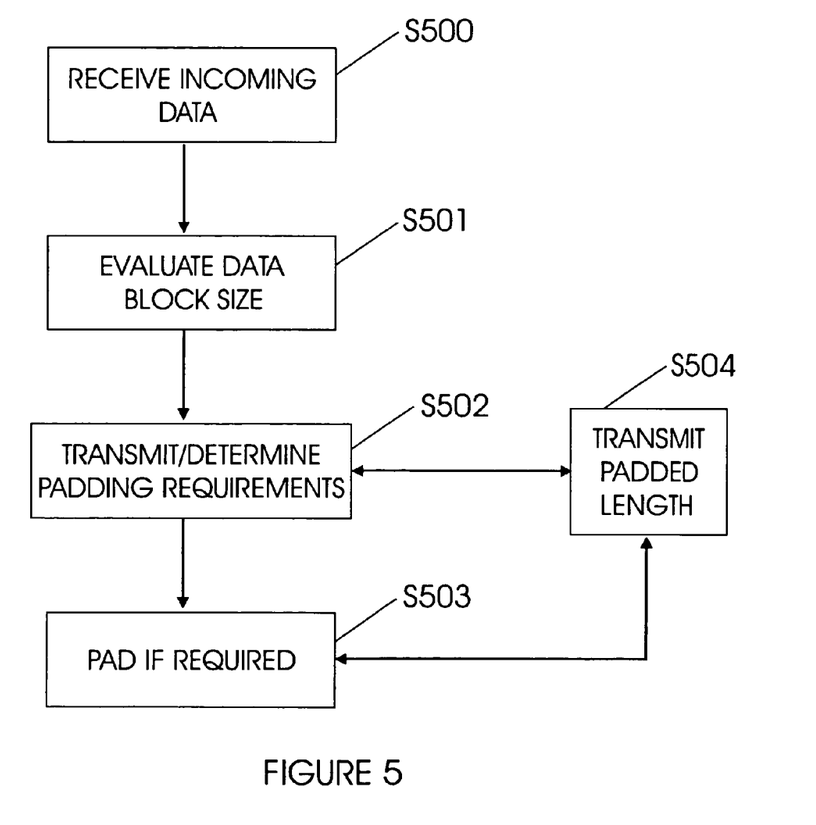
FIG. 5 shows a flow diagram for padding data, according to one aspect of the present invention.

FIG. 5 shows a flow diagram of process steps for padding incoming data. Turning in detail to FIG. 5, in step S500, data (300) is received from SCSI interface 105 at FIFO 200.

In step S501, data block length is evaluated by using the data length counter in register 202.

In step S502, data from FIFO 200 is sent to buffer 111, after a first data length has expired, and padding requirement is ascertained. If no padding is required, data is sent directly to buffer 111.

If padding is required, then data is padded in step S503. For example, if data is received as MOD2 and buffer 111 data is to be stored as MOD4, then two bytes are added to change the data alignment from MOD2 to MOD4.

In step S504, padded data block(s) are sent until all the data has been transferred.

Figure 6:
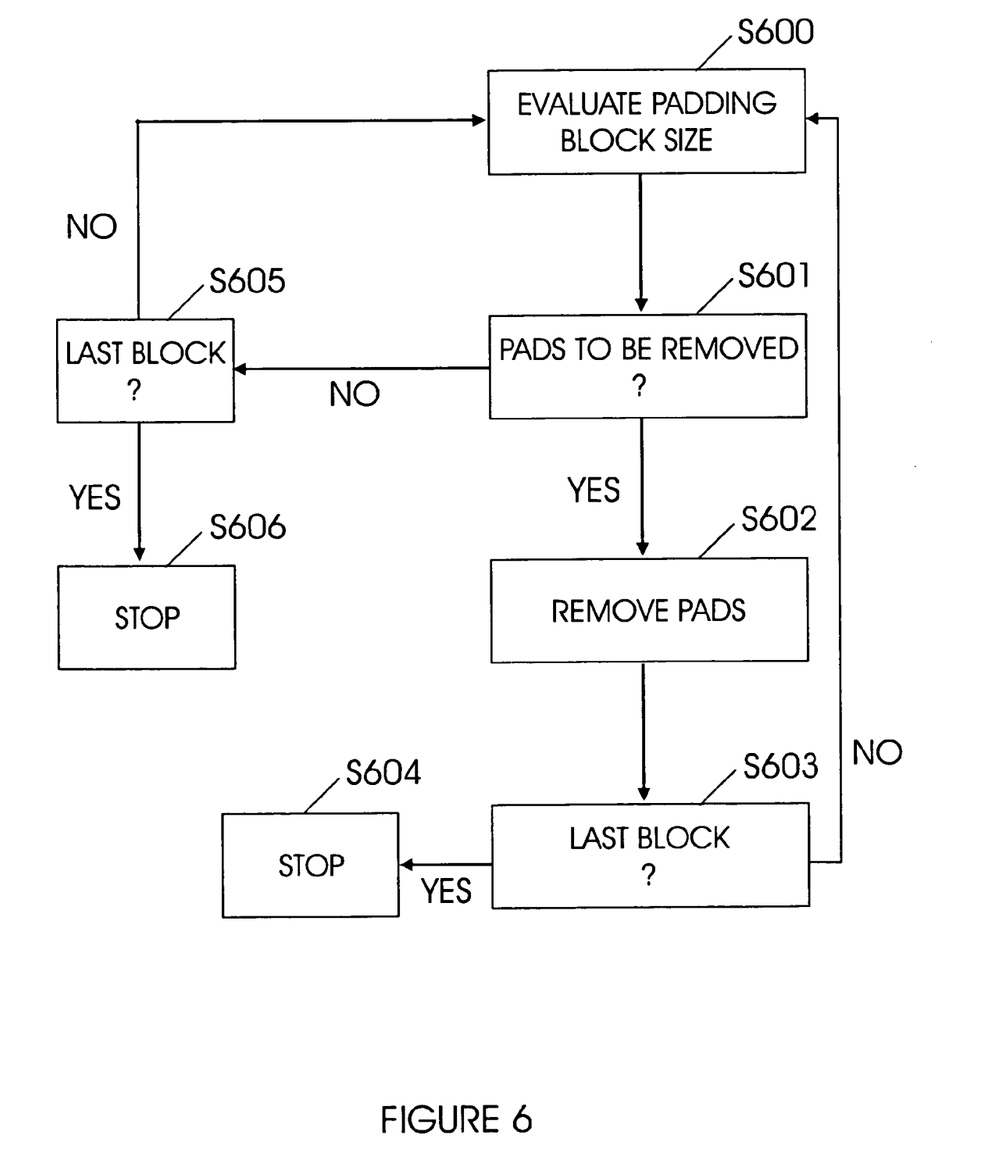
FIG. 6 shows a flow diagram for removing padding, according to one aspect of the present invention.

FIG. 6 shows a flow diagram for removing padded information from data that is read from buffer 111. Turning in detail to FIG. 6, in step S601, the padding block size is evaluated by Channel 1 controller 203. In step S601, the process starts data transfer from buffer 111 and determines if any pad(s) need to be removed. If no pad(s) are to be removed, then in step S605, the process determines if the last block has been transferred. If the last block is not transferred, the process goes back to step S600. If the last block has been transferred, then the process stops in step S606.

If it is determined that pads have to be removed (in step S601), then in step S602, the pad(s) are removed. For example, as shown in FIG. 4, MOD4 data is read from buffer 111 and after the pads are removed, MODN data is sent to SCSI interface 105.

In step S603, the process determines if the last block of data has been transferred from buffer 111. If the last block has not been transferred, then the process moves back to step S600, otherwise, the process stops at step S604.

In one aspect of the present invention, controller 101 can process any MOD size data by padding (or removing the pad). This allows controller 101 to be flexible and hence more useful in the fast changing storage arena.

Although the present invention has been described with reference to specific embodiments, these embodiments are illustrative only and not limiting. Many other applications and embodiments of the present invention will be apparent in light of this disclosure.

What is claimed is:

1. A storage controller, comprising:
a buffer controller configured to operate in a first mode and a second mode,
wherein while operating in the first mode, the buffer controller is configured to
i) load a data length counter with a predetermined data block size stored in a first register, and
ii) receive data having the predetermined data block size from a host system, and
wherein while operating in the second mode, the buffer controller is configured to
i) receive data having a first data alignment from the host system, wherein the first data alignment is associated with a first data block size, and wherein the first data block size can be of any size,
ii) store the first data block size in a second register,
iii) load the data length counter with the first data block size stored in the second register to evaluate whether the first data block size is different from the predetermined data block size,
iii) determine, based on (a) the first data block size loaded into the data length counter and (b) a second data alignment, a padding requirement of the data having the first data alignment, and
iv) selectively pad, based on the padding requirement, the data having the first data alignment to generate data having the second data alignment, wherein the second data alignment is associated with a second data block size; and
a buffer memory configured to i) receive the data having the second data alignment from the buffer controller, and ii) store the data having the second data alignment.

2. The storage controller of claim 1, wherein the buffer controller includes a first channel configured to receive the data having the first data alignment.

3. The storage controller of claim 2, wherein the first channel includes a first in first out memory.

4. The storage controller of claim 2, wherein the first channel includes a channel controller configured to determine the padding requirement.

5. The storage controller of claim 1, wherein the buffer controller is configured to remove padding from the data having the second data alignment that is transmitted from the buffer memory to the host system.

6. A system comprising the storage controller of claim 1, wherein the system further comprises:
a first interface configured to communicate with each of the storage controller and the buffer memory; and
a second interface configured to communicate with each of the storage controller and the host system.

7. The system of claim 6, wherein the second interface is a small computer system interface (SCSI).

8. A data processing method, comprising:
while operating in a first mode,
loading a data length counter with a predetermined data block size stored in a first register, and
receiving data having the predetermined data block size from a host system; and
while operating in a second mode,
receiving, from the host system, data having a first data alignment, wherein the first data alignment is associated with a first data block size, and wherein the first data block size can be of any size;
storing the first data block size in a second register;
loading the data length counter with the first data block size stored in the second register to evaluate whether the first data block size is different from the predetermined data block size;
determining, based on (a) the first data block size loaded into the data length counter and (b) a second data alignment, a padding requirement of the data having the first data alignment;
selectively padding, based on the padding requirement, the data having the first data alignment to generate data having the second data alignment, wherein the second data alignment is associated with a second data block size; and
storing the data having the second data alignment in a buffer memory.

9. The method of claim 8, wherein the step of receiving includes receiving the data having the first data alignment at a first channel.

10. The method of claim 9, wherein the first channel includes a first in first out memory.

11. The memory of claim 9, wherein the first channel includes a channel controller configured to determine the padding requirement.

12. The method of claim 8, further comprising removing padding from the data having the second data alignment that is transmitted from the buffer memory to the host system.

* * * * *